(12) United States Patent
Edwards

(10) Patent No.: US 7,123,569 B2
(45) Date of Patent: Oct. 17, 2006

(54) OPTICAL DATA STORAGE MEDIUM

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 644 days.

(21) Appl. No.: 09/946,012

(22) Filed: Sep. 4, 2001

(65) Prior Publication Data

US 2003/0043723 A1 Mar. 6, 2003

(51) Int. Cl.
*G11B 7/00* (2006.01)

(52) U.S. Cl. .............. 369/100; 369/44.37; 369/275.1

(58) Field of Classification Search ............ 369/100, 369/116, 44.37, 275.1; 428/64.1, 64.4
See application file for complete search history.

(56) References Cited

U.S. PATENT DOCUMENTS

| | | | | |
|---|---|---|---|---|
| 5,060,222 A | * | 10/1991 | Sawano et al. | 369/100 |
| 5,521,901 A | * | 5/1996 | Okada et al. | 369/275.2 |
| 5,541,909 A | * | 7/1996 | Nakajima et al. | 369/275.1 |
| 5,617,394 A | | 4/1997 | Sanada | |
| 5,684,778 A | | 11/1997 | Yamada et al. | |
| 5,784,353 A | | 7/1998 | Matsui | |
| 5,875,160 A | | 2/1999 | Harigaya et al. | |
| 5,965,323 A | | 10/1999 | Takahashi et al. | |
| 5,974,025 A | | 10/1999 | Yamada et al. | |
| 5,976,617 A | | 11/1999 | Hong et al. | |
| 6,040,066 A | * | 3/2000 | Zhou et al. | 428/641 |
| 6,153,355 A | | 11/2000 | Takahashi et al. | |
| 6,188,653 B1 | * | 2/2001 | Nagano et al. | 369/47.5 |
| 6,236,635 B1 | * | 5/2001 | Miyamoto et al. | 369/116 |
| 6,329,036 B1 | * | 12/2001 | Kikukawa et al. | 428/64.1 |
| 6,365,256 B1 | * | 4/2002 | Tyan et al. | 428/64.1 |
| 6,445,033 B1 | * | 9/2002 | Hasegawa | 257/324 |
| 2002/0094405 A1 | * | 7/2002 | Medower et al. | 428/64.4 |

\* cited by examiner

*Primary Examiner*—Gautam R. Patel
(74) *Attorney, Agent, or Firm*—Eric D. Levinson

(57) ABSTRACT

The invention presents systems and methods for initializing the phase-change layer of an optical medium. The methods include alternately quenching the phase-change material into amorphous states and crystallization states in a single pass of an optical head past the optical medium. The systems include one or more light sources that generate at least two amorphous melt regions and at least two crystallization regions in the optical medium.

10 Claims, 5 Drawing Sheets

OPTICAL DATA STORAGE MEDIUM

TECHNICAL FIELD

The invention relates to data storage media and, more particularly, to techniques for manufacturing optical media.

BACKGROUND

Some forms of optical recording media record digital information in a material that can assume two distinct phases. Such media are often referred to as "phase-change" media. In the amorphous phase, the molecules of the material do not exhibit any long-range structure. In the crystalline phase, by contrast, the molecules possess a long-range order. The reflectivity of the material in the amorphous phase is different from the reflectivity of the material in the crystalline phase.

Phase-change material may be included in a disk as a phase-change recording layer. Digital information may be encoded in the phase-change layer by creation of regions of amorphous material and regions of crystalline material. The digital information encoded in the phase-change layer may be recovered by rotating the disk under a focused light and sensing the changes in reflectivity as the light strikes different regions of the disk.

The phase-change recording layer may be deposited on a polycarbonate substrate between dielectric layers and coated with a light reflection and heat dissipation layer. Techniques such as sputtering may be used to form the phase-change layer. The phase-change layer may be a compound comprising silver (Ag), indium (In), antimony (Sb) and tellurium (Te), although other compounds may be used as well.

When sufficiently heated, the material in the phase-change layer melts. Once melted, the material may be "quenched" or cooled into one of two phases: a crystalline phase or an amorphous phase. In general, heating the material to a high melting temperature followed by rapid cooling causes the material to assume the amorphous state. If cooling is more gradual, however, the molecules in the material have time to align themselves, and the material assumes the crystalline state. Although the material must be melted and cooled to cause it to become amorphous, the material may assume a crystalline phase at a lower temperature when heated for a longer time.

An optical recording medium typically includes a recording zone having a vast multitude of tiny regions addressable by a laser beam. The phase-change material in each region forms a data site that may be individually changed from one state to the other, thereby allowing for storage of digital data. The data sites are typically arranged in tracks called "data tracks." Data stored on such an optical recording medium can be erased and/or written over by new data.

SUMMARY

The invention is directed to techniques for initializing optical media that include phase-change material. The effect of these techniques is to run the phase-change material on a medium through several phase-change cycles, before putting the medium into actual use. Initializing the medium with several phase-change cycles conditions the recording layer to reduce jitter in the recorded data.

In addition, the invention is directed to techniques for initializing optical media by moving the medium surface past an optical head and performing the multi-cycle initialization in a single pass of the optical head over the medium surface. Multi-cycle initialization in a single pass of the optical head over the optical medium saves manufacturing time.

Initialization is beneficial to an optical medium employing a phase-change layer, such as a rewritable compact disk, DVD-RW or DVD-RAM. Digital information recorded on a phase-change medium generally can be erased and over-recorded a thousand times or more. A high intensity spot of focused laser light is used for recording, erasing and over-recording. Recorded data may be recovered with a lower intensity spot of focused laser light, which scans the recorded regions and which is affected by the different reflectivities of the amorphous and crystalline regions.

Ideally, the sensed changes in reflectivity occur in precisely separated time intervals. Actual sensed changes typically present some deviation from ideal timing, a phenomenon known as "jitter." Jitter can be manifested in different forms in the first few media cycles of a newly manufactured phase-change disk. A "media cycle" entails changing the phase-change material from one phase to the other and back again, such as from amorphous phase to crystalline phase to amorphous phase. Sometimes a phase-change disk exhibits severe jitter during the first cycle, substantially less jitter on the second cycle, and far less on the third. In other cases, a phase-change disk exhibits little jitter after the first cycle, but substantially more jitter on the second cycle. In general, jitter generally disappears or is greatly reduced after a few media cycles, and remains relatively constant until the optical medium approaches the end of its useful life.

The invention improves media performance and reduces jitter by running the phase-change material through several media cycles during the manufacturing process. The initialization takes place in a single pass of the optical head.

In one embodiment, the invention comprises a system, including at least one light source such as a semiconductor laser. The light source generates at least two amorphous melt regions and at least two crystallization regions in an optical medium comprising phase-change material. The system also includes a drive that moves the optical medium relative to the light source to cause the phase-change material to assume in succession a first amorphous state, followed by a first crystalline state, followed by a second amorphous state, followed by a second crystalline state. The light source causes the phase-change material to undergo at least two media cycles in a single pass. The system further may further include a plurality of light sources.

In another embodiment, the invention presents a method, comprising orienting one or more light sources relative to an optical medium comprising phase-change material and moving the optical medium relative to the light source. In one pass, the phase-change material assumes in succession a first amorphous state, followed by a first crystalline state, followed by a second amorphous state, followed by a second crystalline state. The method may also comprise arranging a plurality of light sources in a pattern and orienting the plurality of light sources relative to the optical medium.

In a further embodiment, the invention comprises a method, comprising moving phase-change material relative to at least one light source that generates an amorphous melt region and a crystallization region in the phase-change material. The phase-change material makes a single pass relative to the light source, causing the phase-change material to assume a first amorphous state, a first crystalline state, a second amorphous state and a second crystalline state.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
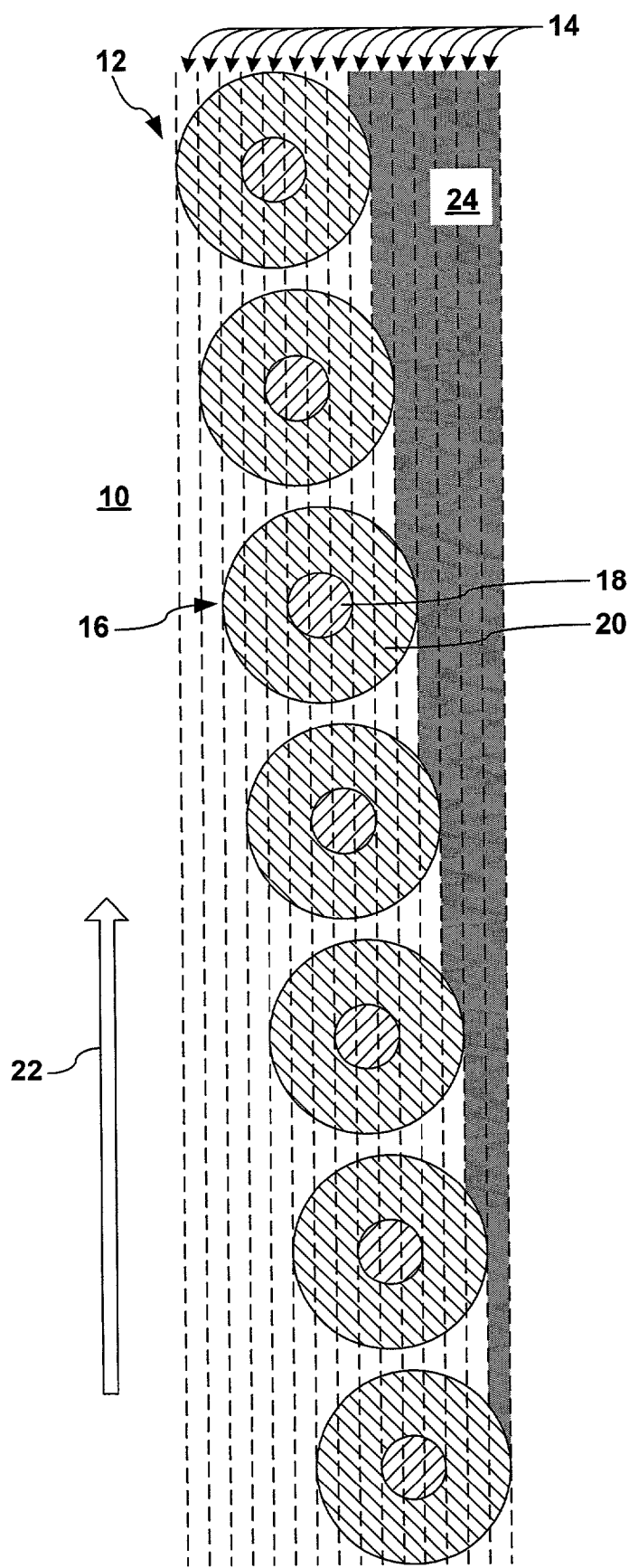
FIG. 1 is a plan view diagram illustrating initialization of an optical medium, including a configuration of spots from an optical head.

FIG. 1 is a diagram showing a plan view of optical medium 10, which includes a phase change layer. Optical medium 10 may be any of a number of phase-change media, such as a phase-change disk. The invention is directed to techniques for initializing the phase-change material in optical medium 10. The manufacturer performs the initialization as part of the manufacturing process.

FIG. 1 shows optical medium 10 divided into several initialization tracks 14, which are arbitrary regions undergoing initialization. Typically, initialization tracks are oriented in the same direction as data tracks but are wider than data tracks. Each initialization track may comprise one or more data tracks, and the number of data tracks per initialization track need not be a whole number.

Spots 12 from one or more light sources are projected onto optical medium 10. The light sources are preferably one or more lasers, such as semiconductor lasers, and are organized in an optical head proximal to optical medium 10. The light sources may emit light at visible wavelengths or at invisible wavelengths, such as infrared wavelengths. Although seven spots 12 are shown in FIG. 1, an optical head may generate more or fewer spots. Each of spots 12 may be generated by a separate light source. Alternatively, one light source may emit light that is split to form two or more spots. As shown in FIG. 1, spots 12 form a one-dimensional array. As will be discussed below, an optical head may generate spots in other patterns, and may generate initializing shapes other than round spots.

Typical spot 16 includes amorphous melt spot 18 surrounded by crystallization spot 20. Amorphous melt spot 18 and crystallization spot 20 are generated by a single focused light source. The size of amorphous melt spot 18 and crystallization spot 20 depend upon factors such as the power of the light source, the focusing of the light, the thermal characteristics of the phase-change layer of optical medium 10 and the thermal characteristics of the dielectric layers and light reflection/heat dissipation layer.

In FIG. 1, amorphous melt spot 18 has been sized to a diameter of three initialization tracks 14, and crystallization spot 20 has been sized to a diameter of nine initialization tracks 14. These proportions are for purposes of illustration, and other spot sizes may be used as well. Furthermore, the boundaries between amorphous melt spot 18 and crystallization spot 20 need not be sharp boundaries.

The quenched state of the phase-change material is a function of the energy imparted to the material, the length of time of exposure to the energy and the cooling rate. The rate of energy transfer is higher in amorphous melt spot 18 than in crystallization spot 20. Accordingly, the temperature induced in optical medium 10 by amorphous melt spot 18 is typically much higher for a given period of time than the temperature induced by crystallization spot 20. With a rapid cooling rate, phase-change material exposed to amorphous melt spot 18 quenches to the amorphous phase. The temperature of crystallization spot 20 is not high enough to cause the phase-change material of optical medium 10 to reach an amorphous state within the same period of time.

Optical medium 10 moves relative to spots 12. The path of optical medium 10 relative to spots 12 is shown by reference numeral 22. In the case of an optical disk, optical medium 10 is typically rotated relative to a stationary optical head, thereby allowing spots 12 to strike initialization tracks 14, which are spirally oriented on the disk.

The optical head is typically allowed to move orthogonally to direction of motion 22 of optical medium 10. Radial motion of the optical head allows spots 12 to strike initialization tracks in other regions of optical medium 10. In a phase-change disk, for example, the optical head may move radially relative to the disk, bringing the optical head closer to or farther from the center of the disk.

The one-dimensional array of spots 12 is oriented such that spots 12 line up slightly offset relative to direction of motion 22 of optical medium 10. As a result, the motion of optical medium 10 causes each point in initialization tracks 14 to be struck by a plurality of spots.

Figure 2A:
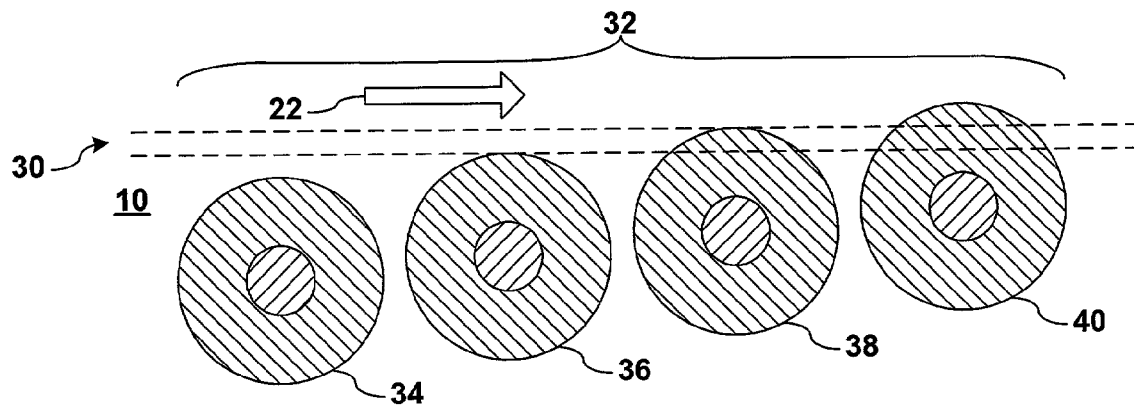
FIGS. 2A, 2B and 2C are diagrams illustrating initialization of an initialization track of an optical medium.
Figure 2B:
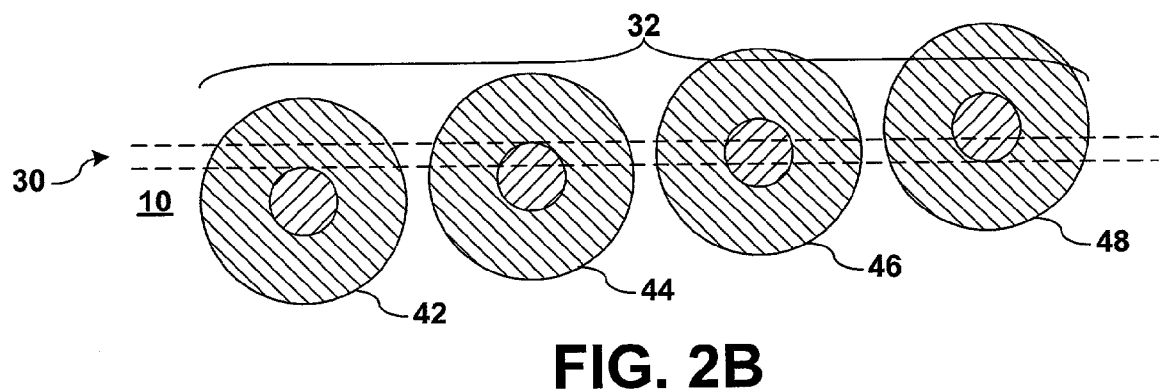
Figure 2C:
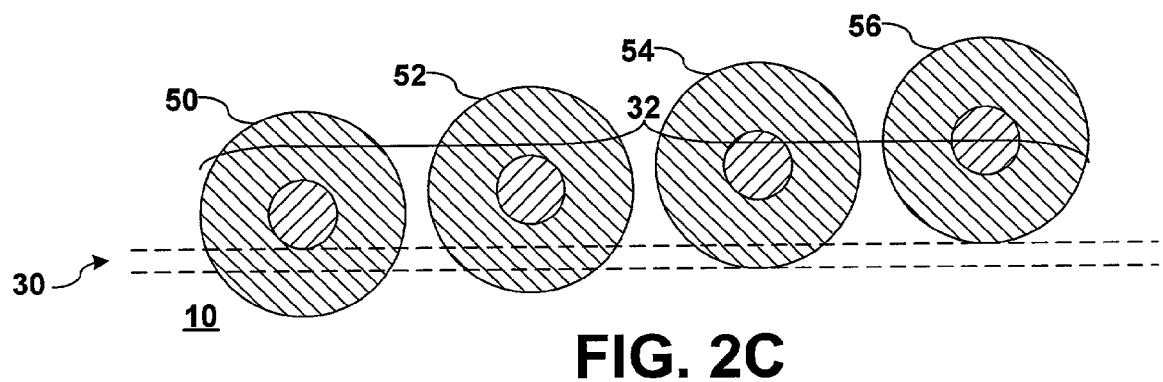

FIGS. 2A, 2B and 2C demonstrate how orienting a one-dimensional array of spots slightly offset relative to direction of motion of optical medium 10 takes phase-change material in a typical initialization track 30 through several phase-change cycles in a single pass. In particular, FIGS. 2A, 2B and 2C show the interaction of typical segment 32 of initialization track 30 with a series of spots 34–56. Like spots 12 shown in FIG. 1, spots 34–56 are slightly offset relative to direction of motion 22 of optical medium 10. Each of spots 34–56 includes an amorphous melt spot and a crystallization spot that surrounds the amorphous melt spot, like typical spot 16 shown in FIG. 1.

In FIG. 2A, segment 32 moves in direction 22, bringing the segment through the crystallization spot of spot 38. Spots 34 and 36 do not affect initialization track 30. Rather, spots 34 and 36 act on regions of medium 10 adjacent to initialization track 30. The crystallization spot of spot 38 may promote crystallization of the phase-change material in initialization track 30, but does not cause phase-change material to melt into an amorphous state. Similarly, the crystallization spot of spot 40, which segment 32 next encounters, may promote crystallization but not melting into an amorphous state.

In FIG. 2B, segment 32 interacts with spots 42–48. The crystallization spot of spot 42 may promote crystallization of the phase-change material, as may the crystallization spot of spot 44. When initialization track 30 passes through the amorphous melt spot of spot 44, however, the phase-change material melts and quenches rapidly from the melting temperature into an amorphous state. The phase-change material does not remain in the amorphous state, because the crystallization spots of spots 44 and 46 heat the phase-change material sufficiently to cause the material to return to a crystalline state.

When initialization track 30 passes through the amorphous melt spot of spot 46, the material quenches into an amorphous state. The material then returns to a crystalline state when passing through the crystallization spots of spots 46 and 48. When initialization track 30 passes through the amorphous melt spot of spot 48, the material again quenches into an amorphous state. The material in initialization track 30 returns to crystalline state after passing through the crystallization spots of spots 48, 50, 52 and 54, as shown in FIGS. 2B and 2C. Spot 56 does not substantially affect initialization track 30.

After initialization track 30 has passed spots 34–56, the phase-change material in initialization track 30 is in the crystalline state. Passing spots 34–56 has caused the phase-change material in initialization track 30 to undergo three media cycles, changing from amorphous to crystalline three times.

Notably, initialization track 30 undergoes three media cycles in a single pass. Initialization track 30 need not pass by the light sources that generate spots 34–56 three times. Moreover, tracks neighboring initialization track 30 undergo media cycling at nearly the same time. In this way, a single pass can produce thrice-cycled region 24 shown in FIG. 1, consisting of several initialization tracks.

By different arrangements of light sources and spots, any number of media cycles may be accomplished on a single pass of the optical medium past the light sources. The invention is not limited to a one-dimensional array of spots.

Figure 3:
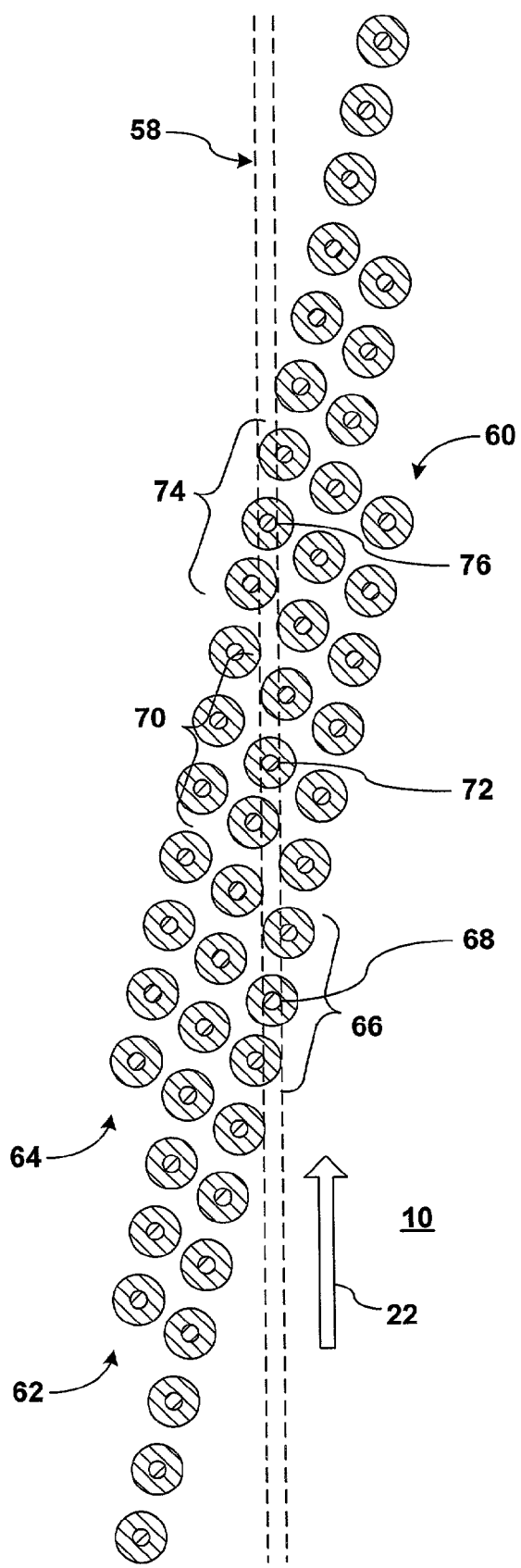
FIG. 3 is a diagram illustrating initialization of an optical medium with an alternate configuration of spots from an optical head.

FIG. 3 illustrates an alternate embodiment of the invention, in which spots are oriented in two dimensions. The optical head may generate spots in columns 60, 62 and 64 on optical medium 10. Like FIGS. 1, 2A, 2B and 2C, each spot includes an amorphous melt spot and a crystallization spot.

As optical medium 10 moves in direction 22, phase-change material in typical initialization track 58 encounters subset of spots 66, which may include several crystallization spots and at least one amorphous melt spot 68. Phase-change material in initialization track 58 quenches into an amorphous state when the material encounters amorphous melt spot 68, then returns to a crystalline state after encountering crystallization spots of subset 66. The encounter with spot subset 66 causes the phase-change material to undergo a media cycle.

The phase-change material in initialization track 58 undergoes two more media cycles when it encounters spot subsets 70 and 74, which include amorphous melt spots 72 and 76. When material has passed array of spots 64, the material has undergone three media cycles. The three media cycles occurred in a single pass of optical medium 10 past the optical head.

Figure 4:
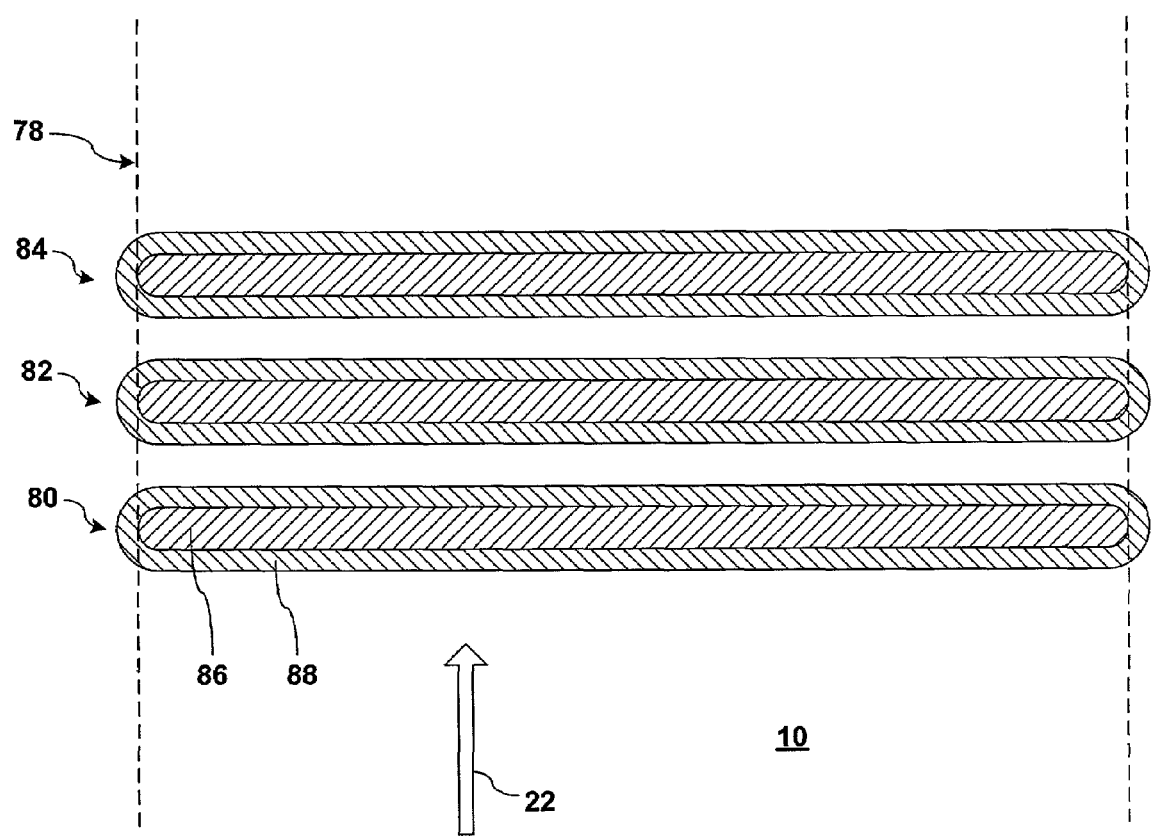
FIG. 4 is a diagram illustrating initialization of an optical medium with another configuration of spots from an optical head.

FIG. 4 illustrates a further embodiment of the invention. FIG. 4 shows three elongated spots 80, 82 and 84 on optical medium 10. Elongated spot 80, for example, includes bar-shaped amorphous melt region 86 and bar-shaped crystallization region 88 surrounding amorphous melt region 86. Elongated spots 82 and 84 likewise include amorphous melt regions and crystallization regions.

Elongated spots 80, 82 and 84 may be created by an array of lasers, with the energy of the individual lasers focused to form bar-shaped amorphous melt regions and bar-shaped crystallization regions. The shape of elongated spots 80, 82 and 84 may be slightly irregular.

Elongated spots sweep over wide initialization track 78. As optical medium 10 moves in direction 22, phase-change material encounters crystallization region 88 of elongated spot 80, followed by amorphous melt region 86, followed by crystallization region 88. The encounter with elongated spot 80 causes the phase-change material to undergo a media cycle.

The phase-change material in data track 30 undergoes two more media cycles when it encounters elongated spots 82 and 84. When material has passed elongated spot 84, the material has undergone three media cycles, and the three media cycles took place in a single pass.

Figure 5:
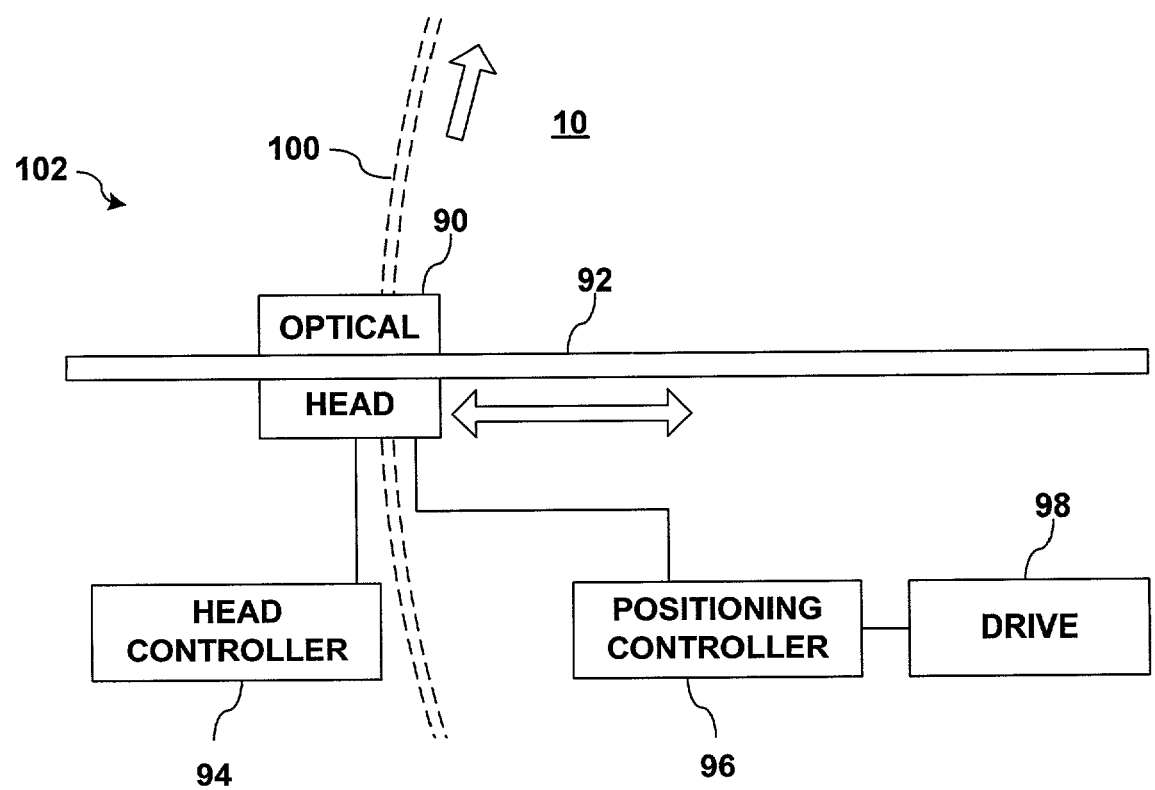
FIG. 5 is a diagram of a system for initializing an optical medium.

FIG. 5 shows a system 102 for initializing optical medium 10. System 102 may initialize a phase-change disk, but a similar arrangement may be employed to initialize other forms of phase-change media. System 102 includes optical head 90, which may be held on support 92, while optical medium 10 is rotated proximal to optical head 90. Drive 98 rotates optical medium 10. Optical head 90 initializes initialization swath 100, which may comprise one or more initialization tracks.

Optical head 90 can move radially along support 92, under the control of positioning controller 96. Positioning controller 92 may cooperate with drive 98 to control the position of optical head 90 with respect to optical medium 10. In particular, positioning controller 92 may radially move optical head 90 and drive 98 may rotate optical medium 10 to bring optical head 90 in proximity to any region of the recording zone of optical medium 10. In this way, positioning controller 92 and drive 98 regulate the position of initialization swath 100.

Positioning controller 92 and drive 98 cooperate to sweep initialization swath 100 in a spiral path along the surface of optical medium 10. Initialization swath 100 covers the recording zone of optical medium 10 with some overlap. Because a single pass of optical head 90 relative to optical medium 10 cycles the phase-change material multiple times, initialization swath 100 overlap is not needed to achieve media cycling. Once optical head 90 has initialized a region, that region need not be initialized again. Ideally, therefore, the amount of overlap should be minimal. As a practical matter, however, a modest amount of overlap may be beneficial, to correct for errors such as variations in the path of initialization swath 100.

The entire recording zone of optical medium 10 is thus initialized in one pass. Initialization by multiple media cycles conditions the microscopic material mixture in the phase-change layer. The conditioning enhances the reliability of the medium and reduces errors in recovering data, including errors caused by jitter. Initialization of optical medium 10 in a single pass of optical head 90 results in a saving of time in the manufacturing process. Mass production of media multiplies the time saving.

Optical head 90 may produce spots on optical medium 10 according to one of the patterns described above, or according to another pattern. Optical head 90 may include any number of lasers or other light sources, arranged in one of any number of single or multiple-dimension configurations.

System 102 may further include head controller 94, configured to activate or deactivate individual light sources in optical head 90. Head controller 94 also may control, for example, the pulse width and modulation frequency of individual lasers in optical head 90. Head controller 94 also may also deactivate light sources in some circumstances. When initializing data tracks near the extreme interior or exterior edges of the recording zone of a disk, for example, some of the light sources may produce spots beyond the recording zone, and consequently those spots are not needed to initialize any phase-change material. The light sources generating such spots may be deactivated by laser controller 94.

A number of embodiments of the present invention have been described. Nevertheless, various modifications may be made without departing from the scope of the invention. For example, the invention is not limited to the particular arrangement of spots as shown in the figures. Many other configurations of spots may be used to achieve multiple media cycles in a single pass.

Although the described embodiments result in three media cycles, the invention is not limited to three media cycles. Some kinds of optical media may work well after more than three media cycles, and other kinds may work well after fewer than three media cycles.

Nor is the invention limited to any particular number of light sources. The light sources need not be arranged in straight lines. Moreover, the light sources need not be arranged to focus their energy into a circular or bar-shaped spot.

Although initialization techniques in accordance with the invention may be particularly useful in the manufacturing process of optical media, they alternatively could be implemented post-manufacture, e.g., by an intermediate value added service provider or even an end user, albeit at reduced speed.

These and other embodiments are within the scope of the following claims.

The invention claimed is:

1. A system comprising:
   one or more light sources positioned to project a plurality of spots onto a phase-change optical medium that includes a phase change material, wherein each of the spots includes an amorphous melt spot surrounded by a crystallization spot; and
   a drive that moves the phase-change optical medium relative to the one or more light sources, wherein the one or more light sources are positioned such that in one pass of the phase-change optical medium relative to the one or more light sources at least a portion of phase change material undergoes at least two media cycles changing from an amorphous state to a crystalline state at least two times in the one pass, wherein the portion of phase change material that undergoes at least two media cycles in one pass defines an initialization track on medium, wherein the phase-change optical medium defines data tracks and wherein the initialization track is wider than each of the data tracks, and wherein the initialization track encompasses a non-integer number of the data tracks.

2. The system of claim 1, wherein the plurality of spots defines a two-dimensional pattern.

3. The system of claim 1, wherein the plurality of spots are elongated such that each of the amorphous melt spots defines a bar-shaped amorphous melt region and each of the crystallization spots defines a bar-shaped crystallization region.

4. The system of claim 1, wherein the drive moves the phase-change optical medium to define exposure time of the spots, and wherein the amorphous melt spots exhibit temperatures sufficient to cause the phase change material to reach an amorphous state along an initialization track within the exposure time and the crystallization spots exhibit temperature insufficient to cause the phase change material to reach an amorphous state along the initialization track within the exposure time.

5. The system of claim 1, wherein the portion of phase change material undergoes at least three media cycles changing from an amorphous state to a crystalline state at least three times in the one pass.

6. A method comprising:
   positioning one or more light sources to project a plurality of spots onto a phase-change optical medium that includes a phase change material, wherein each of the spots includes an amorphous melt spot surrounded by a crystallization spot; and
   moving the phase-change optical medium relative to the one or more light sources, wherein the one or more light sources are positioned such that in one pass of the phase-change optical medium relative to the one or more light sources at least a portion of phase change material undergoes at least two media cycles changing from an amorphous state to a crystalline state at least two times in the one pass, wherein the portion of phase change material that undergoes at least two media cycles in one pass defines an initialization track on the medium, wherein the phase-change optical medium defines data tracks and wherein the initialization track is wider than each of the data tracks, and wherein the initialization track encompasses a non-integer number of the data tracks.

7. The method of claim 6, wherein the plurality of spots defines a two-dimensional pattern.

8. The method of claim 6, wherein the plurality of spots are elongated such that each of the amorphous melt spots defines a bar-shaped amorphous melt region and each of the crystallization spots defines a bar-shaped crystallization region.

9. The method of claim 6, wherein the drive moves the phase-change optical medium to define exposure time of the spots, and wherein the amorphous melt spots exhibit temperatures sufficient to cause the phase change material to reach an amorphous state along an initialization track within the exposure time and the crystallization spots exhibit temperature insufficient to cause the phase change material to reach an amorphous state along the initialization track within the exposure time.

10. The method of claim 6, wherein the portion of phase change material undergoes at least three media cycles changing from an amorphous state to a crystalline state at least three times in the one pass.

* * * * *